Nov. 14, 1961          G. DUPUY          3,008,435

BOMB-PROOF STRUCTURE

Filed Dec. 27, 1957          3 Sheets-Sheet 1

Nov. 14, 1961 G. DUPUY 3,008,435
BOMB-PROOF STRUCTURE
Filed Dec. 27, 1957 3 Sheets-Sheet 2

Nov. 14, 1961   G. DUPUY   3,008,435
BOMB-PROOF STRUCTURE
Filed Dec. 27, 1957   3 Sheets-Sheet 3
Fig 5
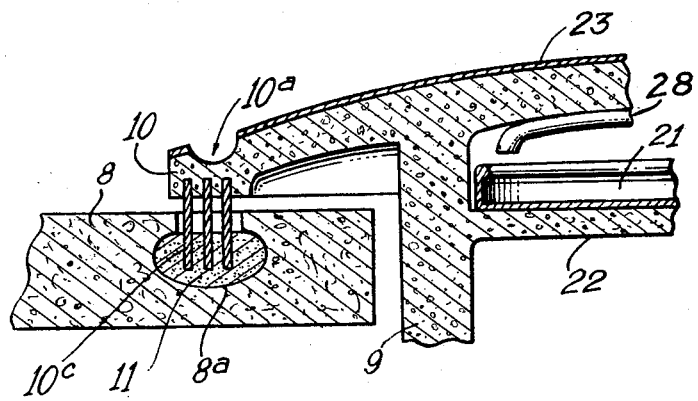
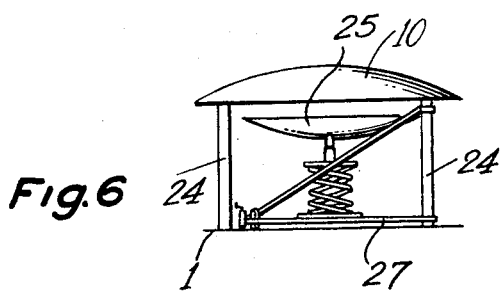
Fig. 6
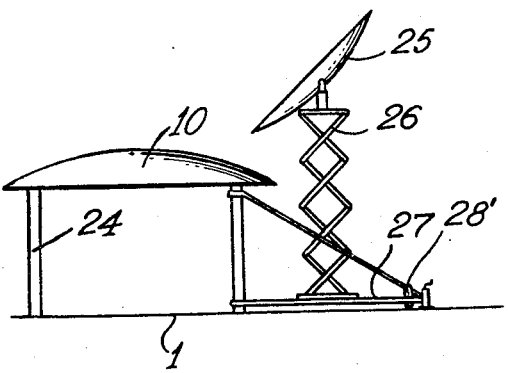
Fig. 7

United States Patent Office 3,008,435
Patented Nov. 14, 1961

3,008,435
BOMB-PROOF STRUCTURE
Gaston Dupuy, 60 Rue Severine,
Aulnay-sous-Bois, France
Filed Dec. 27, 1957, Ser. No. 705,548
5 Claims. (Cl. 109—1)

This invention relates to structure capable of withstanding the effects of nuclear explosions.

Investigation into the results of the Hiroshima explosion and of subsequent explosions of bombs of the so-called A and H types has proved that generally speaking only the superstructure of buildings, i.e. structure above ground level, is actually destroyed, an effect explainable by the surface propagation of the major blast or shock waves from the explosion. It appears hardly practicable to design structure above ground level capable of withstanding the blast of a nuclear explosion, and nuclear bomb shelters have consequently heretofore been designed primarily as underground structures.

However, an underground shelter is objectionable in that it requires a very rapid transfer of persons and possessions from buildings above ground surface to the underground shelters. Recent nuclear defense drills in Stockholm and elsewhere have shown that the time available from the sounding of an alarm to the sealing of the underground shelters is somewhat less than one minute, so that loss of life and valuable property would be inevitable.

It is an object of the invention to provide improved structure whereby loss of life and property in case of nuclear attack will be lessened.

A further object of the invention is to provide a bombproof structure using for protecting radio or radar installations on airport.

According to an important aspect, the invention provides structure supported on a platform and means for imparting to said platform upward and downward vertical movement between a normal position, wherein said structure is supported above the ground surface and a sheltered position in which the structure is supported within an excavation provided under the platform.

In a preferred form of the invention, the excavation is formed with cylindrical walls having a helical guideway formed thereon and the platform may cooperate with said guideway by way of rollers, whereby rotation imparted to the rollers by a suitable motor will selectively raise and lower the platform and structure supported thereon between its said positions.

The above and further objects, features and advantages of the invention will appear as the description proceeds with reference to the accompanying drawings, given by way of illustration but not of limitation, and wherein:

FIG. 5 is a detail view illustrating another seal between the roofing and the surrounding surface;

FIG. 6 and 7 are schematic views showing a bombproof structure protecting a radar installation.

Figure 1:
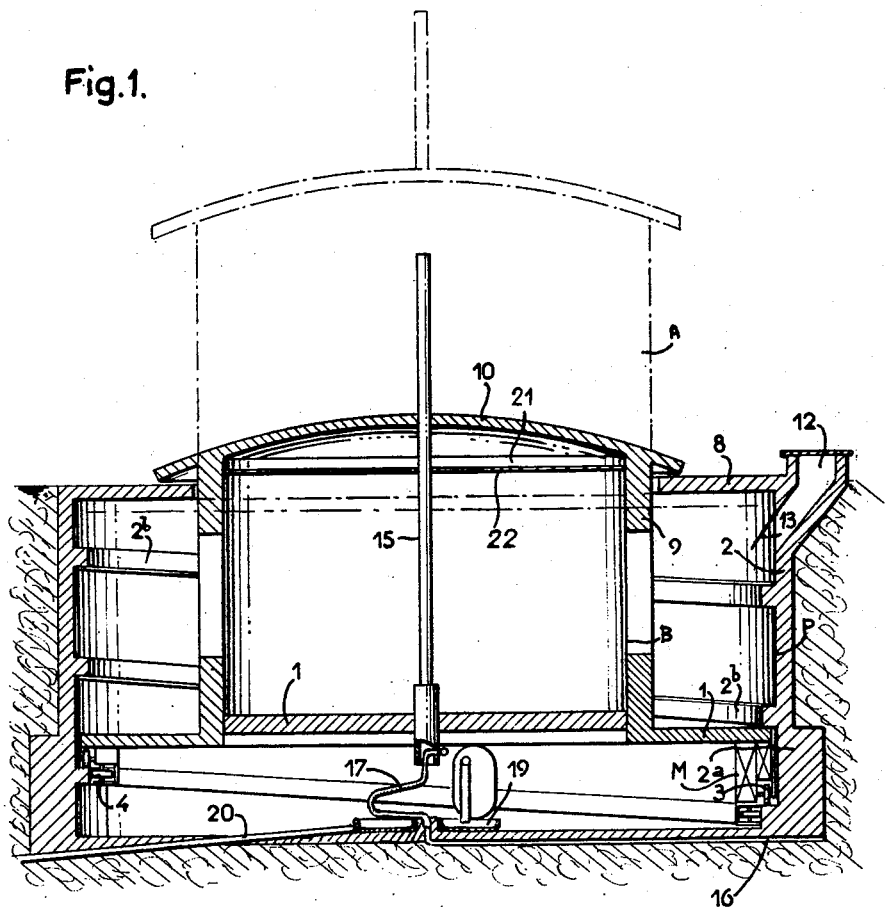
FIG. 1 is a vertical cross-sectional view of structure according to the invention.

As shown in FIG. 1, exemplary structure according to this invention may assume either of two end positions on vertical displacement of a supporting platform 1; in an upper position shown in dot-dash lines as A, the structure is supported at an elevation above ground level, while in the position B shown in full lines, the structure is supported near the bottom of a cylindrical shaft or well P excavated in the ground. The shaft P comprises a cylindrical supporting wall 2 built to withstand the pressure of the surrounding ground and may include suitable foundations 2a. The superiority of tubular structure in resisting collapse is well recognized, so that the circular contour of the walls 2 will provide maximum safety in case of a nearby impact. At the same time, the said cylindrical contour of the shaft wall enables me to provide a helical ramp surface 2b projecting from the wall. This helical surface 2b serves as a guideway for rollers such as 3 and 4 secured on shafts journalled in brackets 5 projecting from the platform 1 which, of course, is also of generally circular form.

While my invention may conceivably be embodied in structure, wherein the platform such as 1 constitutes a more or less conventional lifting or hoist platform arranged to reciprocate vertically without any rotational movement, such an arrangement would involve the use of much more powerful motor means and would not be practicable in connection with large, heavy structures supported on the platform. On the other hand, the use of cooperating helical guide means on the platform and shaft wall enables me to use a comparatively low-powered motor and reducer unit, as indicated at M, for raising and lowering the structure through rotation of the platform relatively to the shaft wall 2. The necessary power will of course depend in part on the slope of the helical guideway 2b used.

In order to retain the platform 1 in proper centered relationship relatively to the shaft, guide rollers 6 are provided secured on shafts journalled in further brackets 7 secured to the platform and riding over vertical surfaces of the helical guideway. The operating motor unit M may be made to rotate through suitable drive means one or more of the rollers such as 6, so that relatively very little power will be required to raise the platform structure to its above-ground position. The downward movement of the structure to its under-ground position may be accomplished by free rotation under the force of gravity, suitable brakes or retarding means, not shown, being provided.

Figure 2:
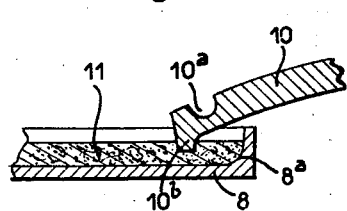
FIG. 2 is a detail view illustrating the seal between the roofing of the structure and a surrounding surface.
Figure 4:
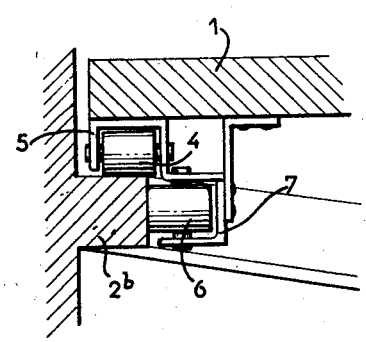
FIG. 4 is a detail view showing the roller means provided on the platform.

A slab 8 forms the top of the cylindrical excavation and is formed with a central opening through which the top of the structure projects, including an upper portion of the walls 9 of the structure and a dome-shaped roof 10 supported on said walls. The dome-roof 10 is formed with an annular roof-gutter 10a for draining rain-water, and connected to a suitable pump or drain, not shown. The circular periphery of the dome-like roof 10 projects, eaves-like, over the periphery of the aperture in top slab 8 and is adapted to cooperate with the upper surface of the slab in the lowered position of the structure to provide a seal illustrated in FIG. 2. The sealing means preferably comprise a downward annular rim portion 10b (FIG. 2) or better a plurality of downward annular sleeves (FIG. 5) projecting from the periphery of roof 10 and adapted to engage a bed of sealing material 11 (sand, lead melting by friction of sleeves) provided in an annular trough 8a formed on the top slab 8.

The seal thus described provides means for isolating the interior of the structure from the surrounding atmosphere to prevent contamination by radiation and fallout, in the lowered condition of the structure. It will of course be understood that suitable conventional plant, not shown, is provided for accomplishing the requisite air-conditioning and ventilating functions. It will be noted moreover that the downward movement of the structure will result in a slight elevation in the inside pressure which will contribute to preventing the entry of the noxious gas-laden outer air, and such slight excess in the inside pressure may be maintained as by vaporizing a liquefied gas, e.g. oxygen.

As shown in FIG. 1, there may be provided an air inlet 12, which would be maintained open in the normal or above-ground condition of the structure and sealed in the condition of danger as by a flapper valve 13 operated remotely and means may readily be provided for causing valve 13 to close automatically in response to some predetermined condition indicative of a nearby nuclear explosion.

It will be appreciated that the novel structure provided in accordance with my invention combines a number of advantages in addition to its comparative indestructibility— except of course in case of a direct hit— and of the consequent safety imparted to its occupants. As a result of these advantages, the novel structure can find many uses in a civilian context instead of, or in addition to, serving exclusively as a bomb shelter during atomic warfare. The said advantages include:

The impossibility of forcing entry into the structure, when in its lowered condition, since the only opening in that condition is formed by the trapdoor which is preferably provided over a safety stairway 14 leading from the interior of the house to the roof 10;

Reduced heating requirements, since in very cold weather the house can be partly or completely lowered and the shaft P will then provide a cushion of relatively warm air effectively isolating the house from the outer cold;

The possibility of selectively orienting the house, so as to direct a selected side thereof towards (or away from), the sun or any other direction; in this connection, it is noted that if the helical pitch of the guideway 2b is selected at a value less than about 20 centimeters, the rotation of the structure can readily be arrested at any desired point of a single circumference, and the depth of the drop or step present between the upper surface of slab 8 and the surface of platform 1 will still be retained within acceptable limits.

Figure 3:
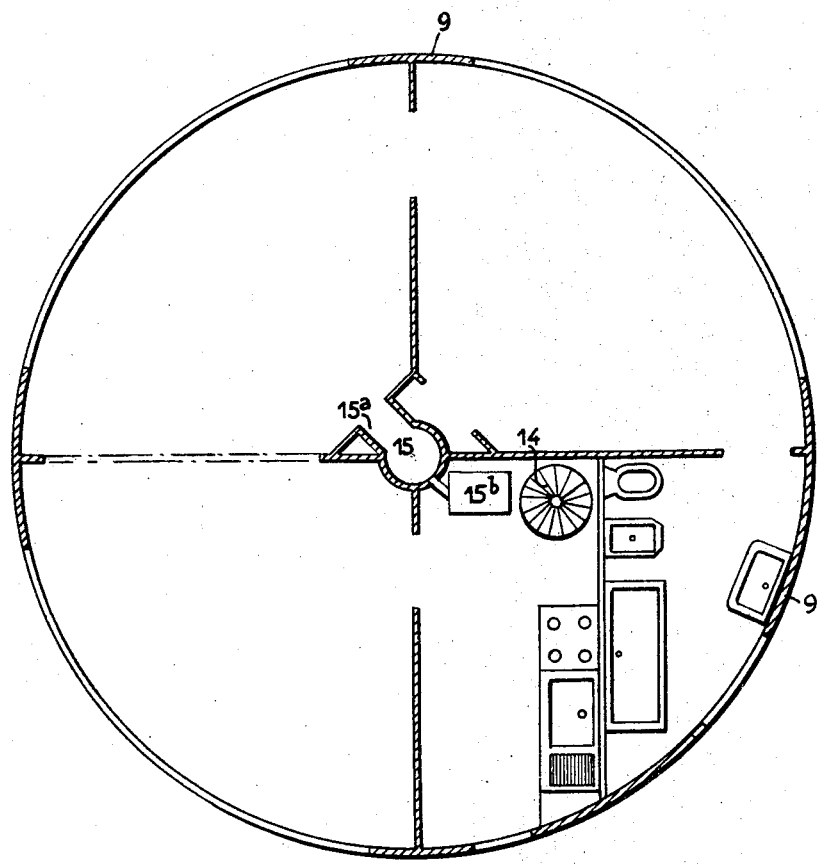
FIG. 3 is a plan view of structure according to the invention designed as living quarters.

A few additional problems arising from the particular construction of a house according to my invention will now be summarily described with particular reference to FIGS. 1 and 3.

While electrical heating will probably be found most convenient, combustion heating may equally well be applied, using any suitable feul such as oil, city gas or natural gas or butane or the like, or any fuel of such character that its combustion can be immediately arrested without the continued generation of combustion gases and fumes. A central chimney stack or flue 15 may be used, suitably connected to burners within the house such as 15b and/or a "fireplace" such as 15a. The central stack 15 would of course be provided with a closure device or valve similar to the device 12 described in connection with the air inlet 12 and similarly adapted to be shut down in case of emergency. Such closure means should be, in this case, positioned below the top of the dome, so as to remain operative in case of the upper part of the stack 15 being damaged or destroyed by an explosion. The stack 15 may stop a suitable height, say about one meter, short of the inner floor level of the house.

Lightweight structural materials are preferably employed in building the improved structure in order to hold down its over-all weight. Thus, for civilian use at any rate, the platform 1 and walls 9 may desirably be made of aluminum or the like. The dome 10 may be made from a suitable strong lightweight grade of concrete, such as pumice concrete or refractory concrete, or bricks, diatomaceous bricks, diatomaceous bricks or the like, and coated with aluminum or stainless steel sheeting.

Above the ceiling shown at 22, there may be provision for supporting a relatively shallow body of water over the ceiling substantially throughout the breadth of the structure. Means may be provided, including a flow circuit not shown, for delivering water into the container in case of emergency and discharging the water to the drains. The said water delivering and draining means may be controlled manually from within the structure or automatically in response to conditions indicative of the occurrence and disappearance of an emergency condition.

With particular reference to the main effects of nuclear explosions, namely blast, heat, and radiation, my improved shelter can be summarily described as offering the following advantageous characteristics:

With regard to blast, it is noted that in view of the buried condition of the structure only the dome is exposed to the shock wave, and its configuration is such as to render it practically invulnerable to the blast effect both during the positive pressure swing of the blast wave and the ensuing negative pressure period or swing.

With regard to heat, the dome can be and preferably is made from a highly refractory and thermally isolating materials, such as brick coated with refractory cement coated in turn with a film of aluminum or preferably stainless steel; such a construction is amply adequate to withstand the effects of heat radiation by reflecting the heat radiation skyward and, moreover, prevent the transfer of heat by conductivity toward the interior of the house, especially since the really high temperature period in a nuclear explosion is of short duration, not longer than three or four seconds.

With regard to radiation effects, it should particularly be noted that whereas in prior nuclear bomb shelter structures, it was endeavoured to absorb the nuclear radiations, in the present structure such radiations are, rather, deflected, a more simple problem capable of more effective solution. This is largely attained through the dome-shaped configuration of the roof and the coating thereof with reflective, e.g. aluminum or other metallic surfacing 23.

With particular reference to nuclear particles generated in a nuclear explosion, i.e. alpha and beta particles, protons, positive and negative electrons, such electrically charged particles are known to be readily absorbed. Thus, a mere sheet of paper is sufficient to arrest alpha particles, a depth of a few centimeters of concrete will similarly arrest positive and negative electrons as well as any protons such as may be discharged from hydrogen-containing substances under neutron bombardment.

While gamma rays cannot be completely arrested, the effective strength thereof can be reduced to below the permissible maximum, e.g. to a value of about 2 mev., by using any of the following barriers: 50 centimeters of water; 25 centimeters of concrete; 7 centimeters iron; 5 centimeters lead. As already indicated, the configuration and the reflective surface imparted to the dome of the structure should practically prevent any substantial entry of gamma rays into the structure. Any such rays that will have entered, moreover, can readily be absorbed and reduced to a safely low level by using suitable depths of absorbing materials in the dome and preferably also the body of water over the ceiling, as described earlier.

The lining on the dome will form an efficient barrier against neutrons. However, in view of a possible secondary emission of gamma rays due to said neutrons as previously mentioned, a tank 21 may be provided between the dome 10 and the ceiling 22 and filled with boron, preferably included in the form of borax or boron carbide mixed with the water filling said tank in case of emergency by the pipe 23.

With particular reference to protection of radio and radar installations, for instance airports, the bomb-proof structure has its dome 10 supported by posts as 24, built on the platform 1.

It is possible for a portable radio or radar installation (approach or landing) to be carried by said structure.

For fixed installations of this type, it is necessary that thay are built on a platform capable of being swung out of said structure.

For instance, the radar antenna 25 is supported by a folding structure 26 built on a platform 27 pivoting around one of the posts 24. Said platform 27 has also a wheel 28' for aiding its rotation.

What I claim is:

1. A bomb-proof structure comprising a rotatable and vertically displaceable platform, supports on said platform, a ceiling and a dome-shaped roof carried on said supports, said roof being made of gamma rays absorbing material externally coated with reflective material, said platform, supports ceiling and roof forming a submergible shelter unit, a tank disposed between said ceiling and roof for receiving a liquid assisting the protection of the inside of hte shelter against radiation, a well-like excavation under the platform at least equal in depth to the height of said supports, wall means limiting the sides of said excavation, a helical guideway formed on the inner surface of said wall means, rollers supporting said platform on said guideway, a stationary slab on top of said wall means, said slab having a central opening for said shelter unit and surrounding said unit an annular groove in the upper face of said slab, a bed of sealing material in said groove, and an annular downward projection on said roof engaging said groove when the shelter unit is lowered by the downward travel of said rollers on said guideway, the screw-like entering motion of said projection into said bed ensuring a tight seal of the excavation against the outside.

2. A bomb-proof structure as defined in claim 1 wherein said sealing material is lead, said lead being molten by the frictional heat developed in the screw-like entering motion of said roof projection.

3. A bomb-proof structure as defined in claim 1 comprising a plurality of concentric downward projections on said roof engaging said groove.

4. A bomb-proof structure as defined in claim 1, including means for sealing said excavation, a liquid reservoir disposed below the roof means, and a boron-containing liquid in said reservoir.

5. In a bomb-proof structure as defined in claim 1 wherein said means of support are a plurality of posts, a second platform pivoting around one of said posts, and a radio or radar tower supported on said second platform.

References Cited in the file of this patent
UNITED STATES PATENTS

| | | |
|---|---|---|
| 719,625 | Throm | Feb. 3, 1903 |
| 1,296,688 | Noah | Mar. 11, 1919 |
| 1,567,893 | Baratta | Dec. 29, 1925 |
| 1,709,914 | Klanke | Apr. 23, 1929 |
| 2,653,468 | Rowles | Sept. 29, 1953 |
| 2,726,339 | Borst | Dec. 6, 1955 |
| 2,773,459 | Sechy | Dec. 11, 1956 |
| 2,792,794 | Miller | May 21, 1957 |
| 2,807,727 | Fermi et al. | Sept. 24, 1957 |
| 2,827,004 | Luce | Mar. 18, 1958 |
| 2,853,624 | Wigner et al. | Sept. 23, 1958 |

OTHER REFERENCES

New York Post (Newspaper) September 4, 1945, page 5, "Atom Bomb Antidote—Sink N.Y.C."